July 6, 1954
A. MATHISEN
2,683,194
SWITCH FOR USE ON AIRCRAFT
Filed Oct. 11, 1948
3 Sheets-Sheet 2
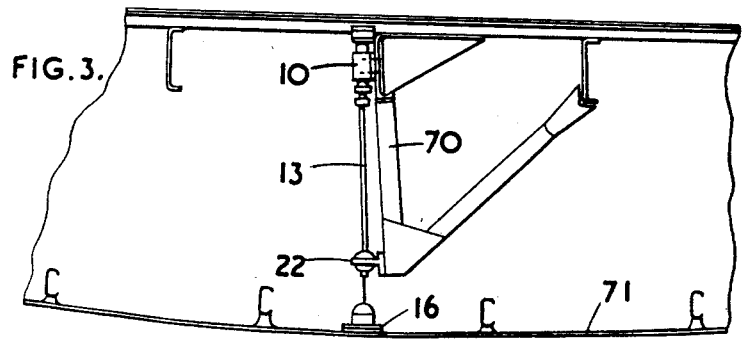
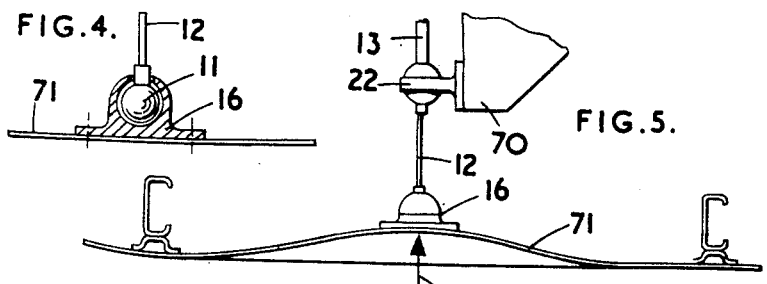
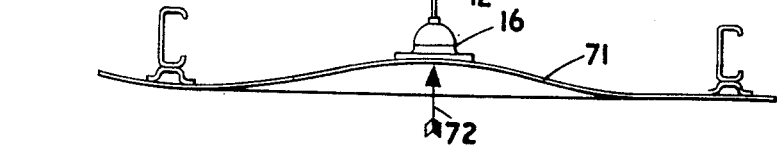
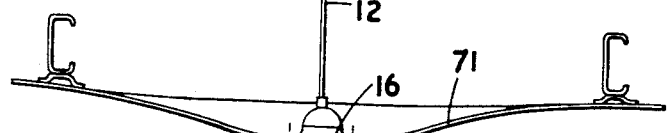
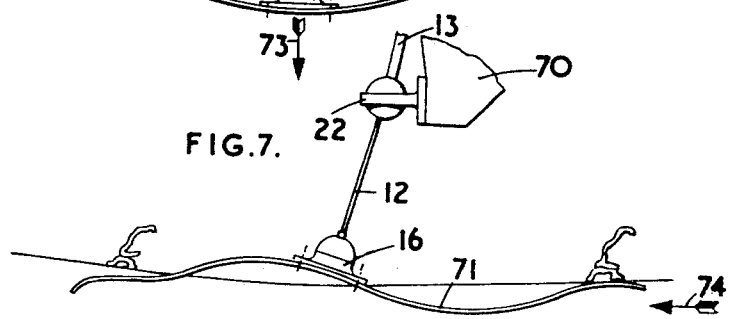
Anders Mathisen,
INVENTOR
By Ben. Chomy.
HIS ATTORNEY Patented July 6, 1954

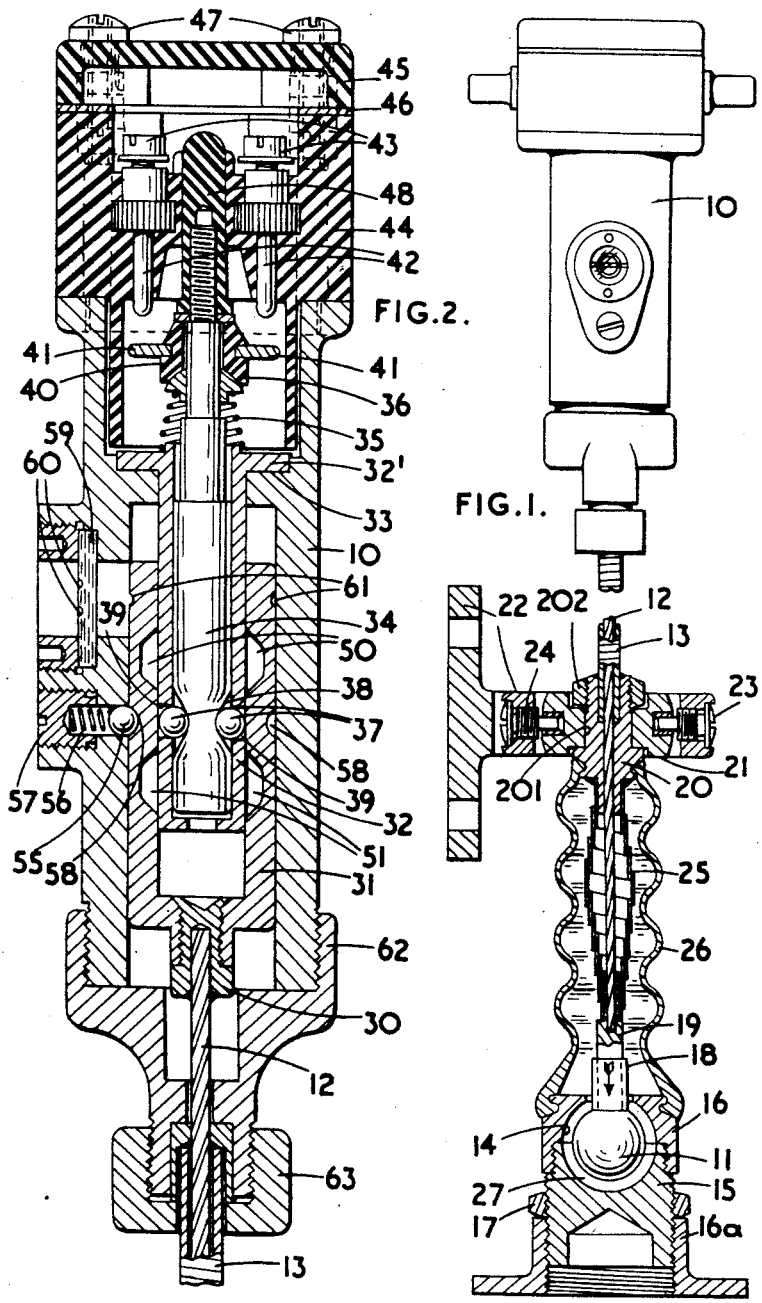

2,683,194

UNITED STATES PATENT OFFICE 2,683,194

SWITCH FOR USE ON AIRCRAFT

Anders Mathisen, London, England, assignor of one-third to Graviner Manufacturing Company Limited, London, England, a British company, and one-third to The Wilkinson Sword Company Limited, London, England, a British company Application October 11, 1948, Serial No. 53,812

7 Claims. (Cl. 200—52)

This invention relates to switches for use on aircraft which are automatically operable in the event of crash or impact, and to aircraft crash or impact detecting systems.

It has previously been proposed to provide a switch for use on aircraft which is automatically operable in the event of crash or impact to close electrical circuits and produce actuation of fire preventing or extinguishing appliances, the switch comprising a spring-pressed switch element proper and a switch release member pressing directly against the switch element to hold it out of the contact position but arranged to be operated in the event of impact or crash to release the switch element, which is then pressed by its spring into the contact position.

While such switch devices may be expected to operate under the majority of crash conditions, under certain circumstances the skin of the aircraft may be ripped off the structure, completely carrying the switch and the associated mechanism with it and thereby severing the electrical connections without causing actuation of the fire preventing or like appliances.

The object of the present invention is to provide an automatic switch for aircraft which will operate more reliably than switches hitherto proposed, and to provide improved aircraft or impact detecting systems.

With this object in view an automatic crash operated switch for use in aircraft made according to the present invention comprises a switch and a switch release member, and according to the invention, the switch release member is directly connected to the underskin of the aircraft and to the switch, whereby the switch release member directly shares in any movement of the skin resulting from crash or impact and releases the switch irrespective of whether the skin moves inwardly or outwardly.

The switch may be mounted some distance from the switch release member on an internal structural member of the aircraft not likely to be damaged by impact and be connected to the switch release member by movement transmitting mechanism.

The movement transmitting mechanism may comprise a flexible or semi-flexible transmission.

The switch release member may comprise a universal joint comprising a fixed part and a movable part, the fixed part being arranged for fixing to a flexible or distortable part of the surface skin of an aircraft.

A lost motion may be provided between the fixed and movable parts of the universal joint.

The switch may comprise a spring-pressed contact-carrying member held normally in a neutral position against the spring action, a fixed contact or contacts, and means, operated by the switch release member for releasing the contact carrying member, the said release means being operable by a push or a pull from the switch release member.

The holding means may comprise one or more balls arranged to lock the contact-carrying member in the neutral position to a fixed sleeve provided with an aperture or apertures to receive the ball or balls, and the release means may comprise a sleeve movable over the fixed sleeve and connected to the flexible member or cable or like transmission and having ball receiving recesses on both sides of the neutral position so that when the cable transmits a pull or a push the recess or recesses on one side of the neutral position come into alignment with the aperture or apertures in the fixed sleeve and the ball or balls are pressed under spring action into the corresponding recess or recesses in the movable sleeve and thus release the contact operating member, which is then moved by its spring to close the contacts.

The contact operating member may have an extension for the purpose of resetting it after operation, the resetting being effected by pushing on the extension to bring the contact operating member back into the neutral position and pushing or pulling on the cable to bring the locking ball or balls into alignment with the aperture or apertures in the fixed sleeve.

An aircraft crash or impact detecting system made according to the invention may comprise automatic crash operated switches made in accordance with the foregoing, and may be used in combination with inertia operated appliances or switches which will effect actuation of fire preventing or extinguishing appliances in the case of high speed crashes or impacts with obstacles or aircraft portions not provided with deformation detecting switches or appliances.

The inertia and deformation detecting switches may be connected to electrical relay devices adapted upon actuation in a crash or the like to effect actuation of the fire preventing appliances, discharge of fire extinguisher liquid containers and the like and to perform other functions as desired.

The foregoing and other features of the invention are illustrated in the accompanying drawings in which:

Fig. 1 is a view illustrating one form of crash detector made according to the invention, the switch release member being shown in section.

Fig. 2 is a longitudinal section of the switch shown in elevation in Fig. 1, the connection of the switch to the movement transmission being also shown.

Fig. 3 illustrates the manner of mounting the detector shown in Fig. 1 in the interior of an aircraft.

Fig. 4 is a detail section illustrating the attachment of the device to the skin of an aircraft.

Figs. 5 and 6 illustrate respectively deformation of the skin of an aircraft resulting from inwardly and outwardly directed forces such as would operate the switch.

Fig. 7 illustrates deformation of the skin of an aircraft as a result of a horizontally directed force, such as would operate the switch.

Figure 8:
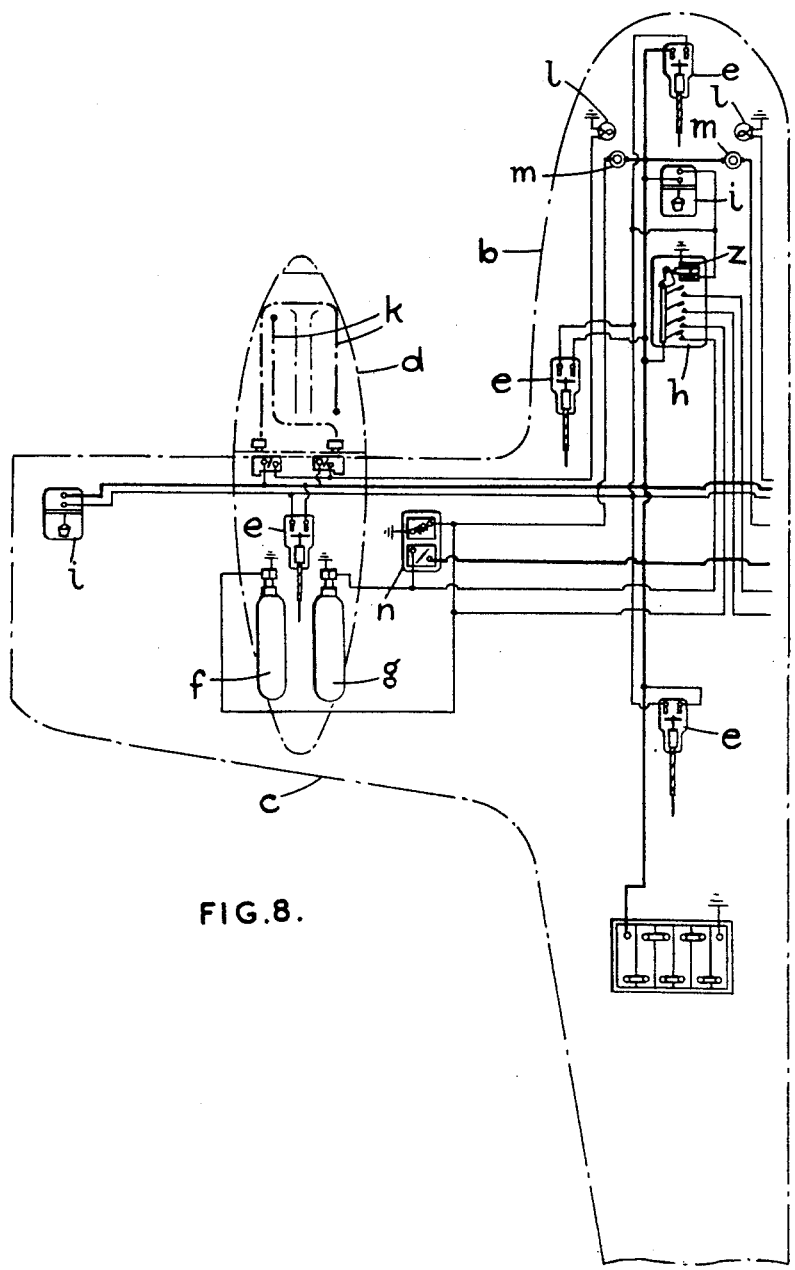
Fig. 8 illustrates an aircraft crash or impact detecting system installed in an aircraft.

Referring first to Figs. 1 and 2 the crash detector shown therein comprises a switch the parts of which are enclosed in a casing 10, and a switch release member comprising a ball 11, the latter being operatively connected to the switch by a cable comprising a semi-flexible wire 12 enclosed in a flexible sheath 13. The ball 11 is located in a spherical socket 14 in a casing comprising a body portion 15 and a cap 16 arranged to be screwed together, the body 15 being screwed into a flanged fitting 16a and retained in position by a lock nut 17.

The ball 11 is provided with a neck 18 to receive a nipple 19 fixed to the end of the wire 12, which is exposed at the end connected to the ball, the exposed portion terminating inside a sleeve 20 the opposite end of which receives the sheath 13. The sleeve 20 is mounted in a gimbal device comprising inner and outer housings 21, 22 connected at opposite ends of a diameter by gimbal bolts 23, 24, the inner housing 21 being fitted in a waist 201 formed in the sleeve 20 and being secured therein by a nut 202 engaging a screw threaded part of the waist 201.

The exposed end of the wire 12 is enclosed in a gaiter comprising an involute spring 25 wrapped tightly at its ends around one end of sleeve 20 and around the nipple 19. The gaiter 25 is in turn enclosed in a dust cover 26 fitted on to the ends of the sleeve 20 and the cap 16. As clearly shown in Fig. 1 a spherical space 27 is provided between the ball 11 and the socket 14 to provide a lost motion for the ball 11, for the purpose hereafter described. The position of the flanged fitting 16a with respect to the gimbal device can be adjusted to suit different types of aircraft by screwing the cap 16 more or less on to the body 15.

The wire 12 is connected at its other end to a nipple 30, Fig. 2, screwed into the end of a sleeve 31 operating the switch and which is slidably arranged inside the switch casing 10. Slidably mounted inside the sleeve 31 is a fixed bush 32 having a flanged end 32¹ bearing against a shoulder 33 formed in the casing 10. The bush 32 serves as a guide for the contact plunger 34 slidably mounted therein and normally tending to shoot forward under the action of spring 35 bearing between the flange 32¹ and an insulator bearing unit 36 fixed to the forward end of the plunger 34, but restrained from so doing by balls 37, 37 engaging in a waist 38 in the plunger and in apertures 39, 39 in the fixed sleeve 32. The forward end of the plunger 34 is of reduced diameter and has fixed thereto an insulator block 40 carrying a contact plate 41 arranged, when the plunger 34 moves forwardly, to make contact with contact pins 42, 42 secured by screws 43, 43 in a terminal block 44, which, together with terminal block cover 45 and an interposed gasket ring 46, is secured to the end of the casing 10 by studs 47, 47.

The extreme end of the plunger 34 beyond the block 40 is further reduced and this extreme end is screw-threaded and screwed into a reset button or pin 48.

The inner surface of the sleeve 31 is formed with two pairs of circular (or circumferential) recesses 50, 50 and 51, 51. The parts in the positions shown in Fig. 2 are in a neutral, i. e. an inoperative position. When a push or pull of sufficient magnitude is imparted to the wire 12 the sleeve 31 is moved correspondingly to bring one or other pair of recesses 50 or 51 into alignment with the balls 37, 37, so that, under the action of the spring 35 the balls are forced out of the apertures 39 into the recesses 50, 51, thus releasing the plunger 34, which, under the action of spring 35, moves to close the contact plate 41 on the contact pins 42. After operation the plunger 34 can be reset by depressing the button 48 thus returning the plunger into the neutral position and then pushing or pulling on the wire 12 to move the sleeve 31 into the neutral position, the balls then dropping back into the apertures 37. This resetting operation simultaneously retensions the spring 35.

The resetting operation is facilitated by providing a locating device for the neutral position. This locating device comprises a ball 55, pressed by a spring 56 disposed in a screwed plug 57 screwed into the casing 10, and a circular groove 58 in the outer wall of the sleeve 31, into which the ball is pressed by the spring. Means are also provided for visually supervising the resetting operation, these means comprising an inspection window 59 provided with two spaced markings, e. g. notches 60, 60 and a circular groove 61 on the sleeve 31 which, in the neutral position is centred relatively to the notches 60, 60.

The switch is completed by an end cap 62 screwed on to the end of the casing 10, and a cable retaining nut 63 screwed on to the end of the end cap 62.

The device above described is installed in an aircraft in the manner shown in Figs. 3 and 4. In Fig. 3, the numeral 70 denotes an internal structural switch supporting member of an aircraft to which the switch casing 10 and gimbal member 22 are screwed, the switch being disposed a substantial distance from the skin 71 of the aircraft. The fitting 16 of the switch release member is screwed to, and inside of, the skin 71.

Fig. 5 illustrates inward deformation of the skin occurring as a result of impact acting in the direction of the arrow 72. As a result of such impact the wire 12 will transmit a thrust to the sleeve 31, moving the latter to release the locking ball 37 and close the contacts 41, 42, as above described.

Fig. 6 illustrates outward deformation of the skin occurring as a result of a force acting outwardly in the direction of the arrow 73 due to bulging of the skin surface 11. In this case the cable 12 is pulled and again moves the sleeve 31 (but this time in the opposite direction) again to close the contacts.

Fig. 7 illustrates a case where impact, the force of which acts in the direction of the arrow 74, tends to shear or rip the skin away from the aircraft. In this case also the wire 12 will be pulled or pushed, and in either case will close the switch contacts.

It will be noted that even if the switch release member is torn away as a result of impact and the wire 12 broken, this cannot occur without previously imparting a pull or thrust on the wire 12 so that the switch will be operated. Further, since the switch is located inside the aircraft, well away from the skin, it is unlikely to be torn away with the switch release member before operation of the switch has occurred. In this connection it should be explained that the connection between the wire 12 and the sleeve 31 is weaker mechanically than the attachment of the switch to the structural member 70, so that if a powerful pull is continued after the switch has been operated, the connection will be broken and the switch will not be pulled away from the member 70.

In all cases the lost motion provided by the space 27 will ensure that the switch is not operated by normal vibration or "panting" of the aircraft skin.

Fig. 8 illustrates an aircraft crash or impact detecting system comprising devices made as above described installed in an aircraft only part of the outline of which is shown in chain lines. In this figure automatic impact detecting switches made according to Figs. 1 and 2 are denoted e, two being mounted approximately centrally below the fuselage b and one on each side of the centre line only one of which is shown, another being shown below the engine nacelle d. Others may be mounted adjacent or near the tips of the wing c. The reference letters f and g denote fire extinguishing fluid containers, the container f being generally connected to the air intake of an aero engine and the container g being generally connected to fire extinguishing fluid distributing pipes arranged over the aero-engines in nacelles d in a known manner.

The fire extinguishing containers f and g are arranged to be electrically operated and are controlled by a relay h which comprises a plurality of electrical contacts normally held in the open position but capable of closure when a solenoid of electro-magnetic relay z is energised from any one of impact detectors e or from a known type of crash switch i, said extinguisher containers being electrically operated to discharge instantaneously when the contacts of relay h are closed.

Apart from the crash or impact actuated fire prevention or extinguishing equipment, aircraft are normally provided with a fire or flame detector device k adapted to light fire warning lamps l if a fire should occur on one of the aero engines for example during flight or on the ground, and fire extinguisher push button control switches m are provided which the pilot or other crew member can operate when the warning light l is energised. Operation of a switch m effects instant discharge of the extinguisher f into the air intake which tends to choke the engine, and a delay action switch n effects delayed discharge of the extinguisher g, some 10 seconds after operation of switch m, at which stage the engine should have ceased to fire and to rotate. This latter arrangement is generally known.

An aircraft crash or impact detecting system according to the invention may comprise automatically operated switches as described above in combination with other impact or crash operated devices and the like, and in order to provide a comprehensive crash or impact detecting system the above described deformation detecting appliance system may be provided in combination with inertia operated appliances or switches which will effect actuation of the fire preventing or extinguishing system in the case of high speed crashes or impacts with obstacles or aircraft portions not provided with deformation detecting switches or appliances.

The inertia and deformation detecting switches may be connected to electrical relay devices adapted upon actuation in a crash or the like to effect actuation of the fire preventing appliances, discharge of fire extinguisher liquid containers and the like and to perform other functions as desired.

In the case of single engine and small twin-engined aircraft one inertia switch installed in a lower forward portion of the aircraft fuselage will normally suffice when supplemented by three to five deformation detecting switches disposed within the fuselage so that one or more may be actuated in a belly landing or in a crash caused by a landing wheel collapsing.

In the case of larger aircraft one inertia switch may be provided in the fuselage as described above and one in each wing mounted outside the outer engine or in the outer engine nacelles, these being supplemented by from seven to fifteen deformation detecting switches disposed within the fuselage or hull in positions in which actuation of one or more may be expected in belly or other inadvertent landing conditions and a number of switches may also be provided in the engine nacelles and in the leading edge or other position of the wings so as to ensure actuation when a wing strikes an obstruction such as a tree or the ground.

In some cases deformation detecting appliances may act directly upon inertia or other switch appliances to effect actuation of these under crash conditions.

Various modifications of the above described devices and arrangements are within the scope of the invention. For example, the projecting position of the flexible or semi-flexible movement transmission means may be enclosed in a frangible or shatterable guard member which is secured to the support member for the sheath end and is engaged by an actuator device secured to the skin structure by a lost movement device as described above so that "panting" and the like does not cause fracture of the guard device.

In this construction the flexible member or the sleeve member to which it is connected in the switch is under spring tension so that displacement of the sleeve takes place when the guard is shattered in a crash.

If the skin should bulge outwardly in a crash the flexible member will compress the spring, applying tension thereto, the sleeve and ball arrangement permitting actuation of the switch as previously described. Further the frangible guard may have a bell mouth end secured to the sheath support and a small bore extension enclosing the free end of the flexible member as this construction facilitates fracture and collapsing in a crash.

What I claim and desire to secure by Letters Patent is:

1. In an aircraft having a skin subject to predetermined normal deflections caused by aerodynamic stresses when in motion, said skin being deformable under abnormal conditions resulting in abnormal deflections of said skin in excess of said normal deflections; in combination, means controlling a safety function of the aircraft, comprising actuator means mounted internally of the skin, a movable member mounted internally of the skin in position to respond to abnormal deflections of the skin either inwardly or outwardly and being unaffected by normal deflections of the skin, means cooperating with said actuator means and said movable member for normally holding said actuator means in an inoperative position, and said movable member, upon being subjected to such abnormal deflections of the skin, operating upon said cooperating means to release the actuator means to initiate the actuation of the means controlling such safety function.

2. A crash-responsive device for aircraft mounted wholly within an aircraft structure, comprising switch means having a first contact fixedly mounted on a part of the aircraft frame within the skin enclosure, a second contact mounted for movement relative to the first contact, means normally holding said contacts out of engagement and actuating means operatively connected with the second contact, said actuating means including a universal joint comprising a first part fixed to a flexible or deformable part of the skin of the aircraft and a second part loosely mounted in the first part, said actuating means being operative by the skin under deflection thereof beyond a predetermined limit of movement to cause contact between the contacts of the switch.

3. A crash-responsive device according to claim 2 in which the parts of said universal joint are loosely mounted in such manner that sufficient lost motion is provided between the parts to insure the switch is not operated by the normal deflection of the aircraft skin due to aerodynamic stresses in flight.

4. A crash-responsive device according to claim 2 in which said universal joint comprises a ball and socket, the socket being connected to the underside of the aircraft skin and the ball being loosely mounted in the socket.

5. A crash-responsive device according to claim 4 in which the actuating means comprises a flexible push-pull member, one end of which is connected to the ball of the universal joint.

6. An automatic crash operated device for use for fire control in aircraft comprising an electric switch, means for mounting the switch within the aircraft skin, said switch having a movable contact-carrying member, at least one fixed contact, a spring acting on said contact-carrying member and tending to press it into a contact-closed position to co-operate with said fixed contact to close a circuit, means for normally holding said contact-carrying member in a contact-open position against the action of said spring, a switch release member for releasing said holding means, push-pull transmitting mechanism for connecting said switch release member to said holding means, and means for connecting said switch release member to the inner surface of the skin of an aircraft, whereby said switch release member when enclosed within the body of an aircraft will respond to movement of the skin in any direction resulting from crash or impact, said movement of the switch release member actuating said push-pull transmitting mechanism to transmit a corresponding pull or push to release said holding means and operate said switch.

7. An automatic crash operated switch for use in aircraft according to claim 6 in which said holding means comprises a fixed sleeve surrounding said contact-carrying member and provided with a pair of apertures, a sleeve movable over said fixed sleeve and connected to said push-pull transmitting mechanism and having at least two ball receiving recesses disposed respectively in the switch open position on opposite sides of said apertures in said fixed sleeve, balls in said apertures in said fixed sleeve and engaging respectively in the switch open position in a recess in said contact-carrying member, in which position said balls are held by said movable sleeve, whereby when said push-pull transmission is operated said movable sleeve moves over said fixed sleeve and said balls in said apertures drop into a recess in said movable sleeve, and release said contact-carrying member whereupon the latter is operated by said spring.

References Cited in the file of this patent

UNITED STATES PATENTS

| Number | Name | Date |
| --- | --- | --- |
| 1,840,986 | Townsend | Jan. 12, 1932 |
| 1,956,484 | Bate | Apr. 24, 1934 |
| 2,189,147 | Mathisen | Feb. 6, 1940 |
| 2,331,017 | Ericson | Oct. 5, 1943 |
| 2,352,692 | Dann | July 4, 1944 |
| 2,385,825 | Mathisen | Oct. 2, 1945 |
| 2,551,752 | Mathisen | May 8, 1951 |
| 2,581,078 | Corfield et al. | Jan. 1, 1952 |